Nov. 26, 1957 P. N. SITTON 2,814,329
METHOD AND APPARATUS FOR MAKING THE WALL PORTION OF A SEPTIC TANK
Filed Feb. 1, 1956 2 Sheets-Sheet 1
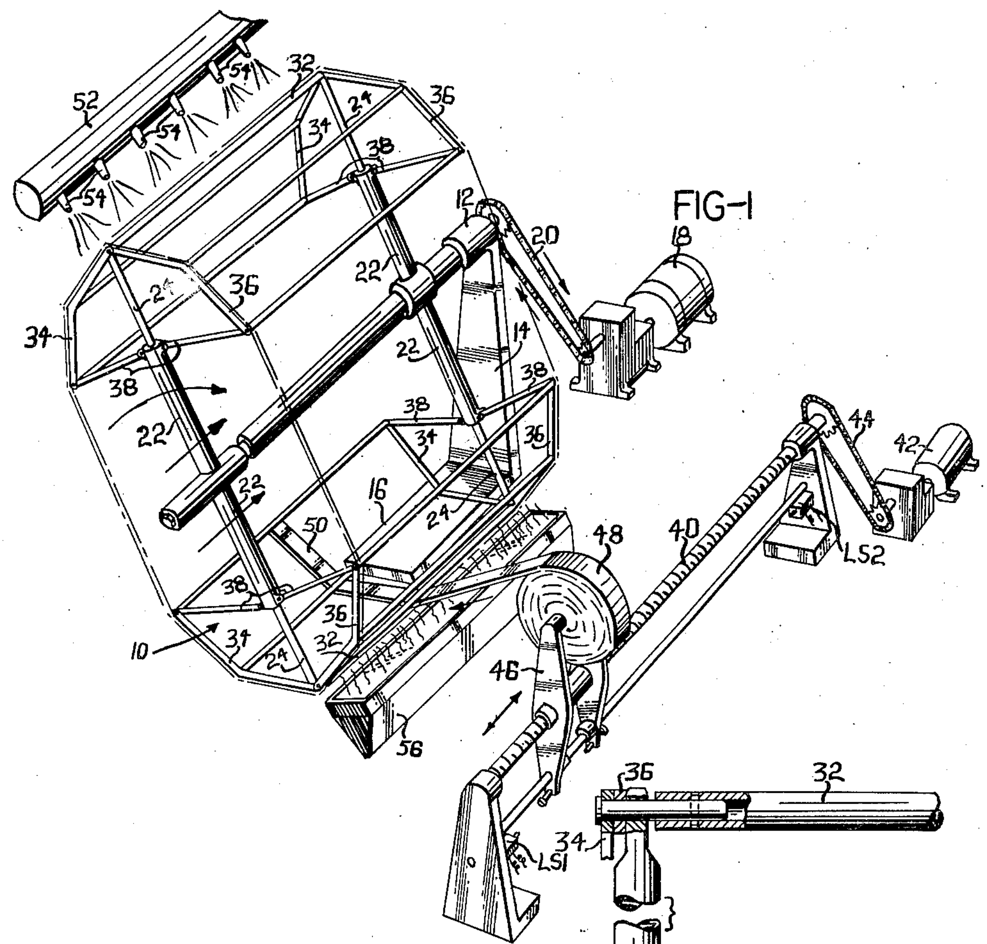
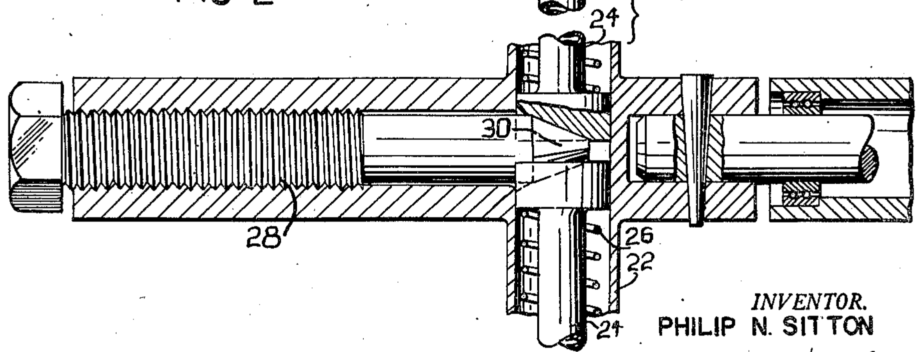
INVENTOR.
PHILIP N. SITTON
BY Toulmin & Toulmin
ATTORNEYS INVENTOR.
PHILIP N. SITTON
BY Toulmin & Toulmin
ATTORNEYS United States Patent Office 2,814,329

Patented Nov. 26, 1957

1

2,814,329

METHOD AND APPARATUS FOR MAKING THE WALL PORTION OF A SEPTIC TANK

Philip N. Sitton, Dayton, Ohio

Application February 1, 1956, Serial No. 562,711

7 Claims. (Cl. 154—1.8)

This invention relates to a septic tank and to a method and apparatus for manufacturing such a tank.

Heretofore septic tanks have generally been made of concrete or steel, but such structures have certain inherent faults in that they are susceptible to erosion and corrosion and are also quite heavy.

The present invention has, as a primary objective, the provision of a septic tank structure and a method and apparatus for making the structure which will avoid the drawbacks referred to above that obtain in connection with concrete and steel tanks, while at the same time providing a septic tank structure which will have an extremely long life.

A particular object of the present invention is the provision of a septic tank structure in which resin, such as polyester resin, forms a primary construction material but wherein this resin is strengthened and reinforced by a less expensive filler material.

Another object of the present invention is the provision of a method and apparatus for making the side wall portion of a septic tank which can later be combined with a top and bottom in order to make a complete septic tank structure.

Another particular object of the present invention is the provision of a method and apparatus for manufacturing a septic tank in which the greater part of the wall of the tank is made up of inexpensive fabric and bulk material, but wherein the tank is absolutely fluid-tight at the time of manufacture and remains so during use.

A further object of the present invention is the provision of a septic tank of the nature referred to in which a laminated type structure is employed thereby providing greater strength and an extremely light structure.

These and other objects and advantages of this invention will become more apparent upon reference to the following specification taken in connection with the accompanying drawings, wherein:

Figure 1 is a perspective view showing one arrangement for manufacturing a septic tank according to this invention;

Figure 2 is a detail of construction of the apparatus illustrated in Figure 1;

Figure 3:
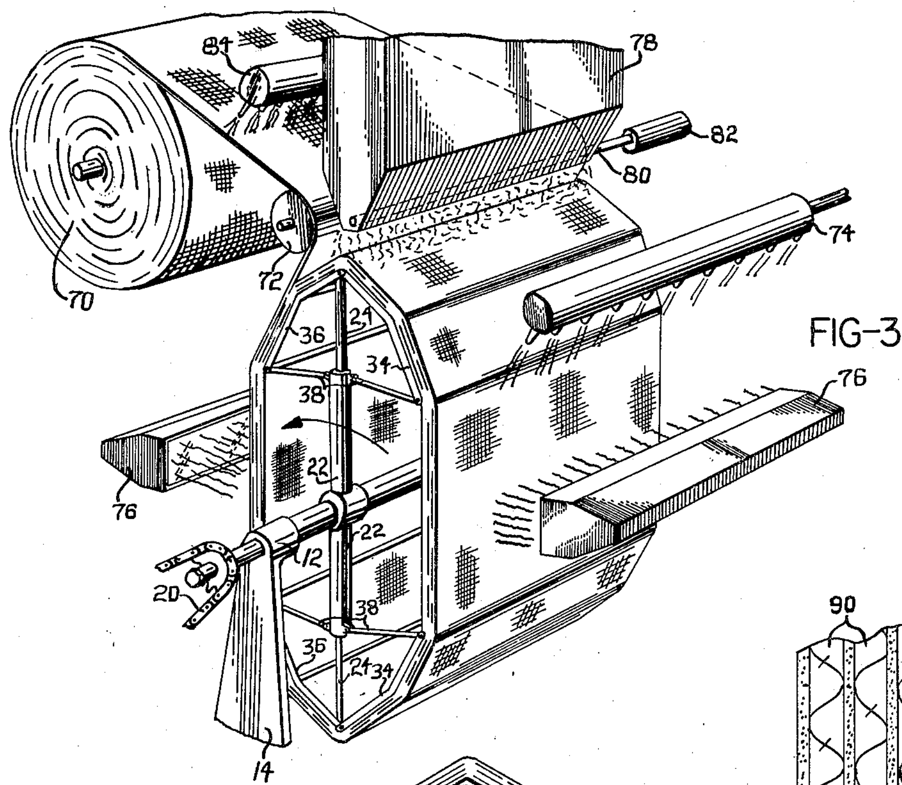
Figure 3 is a perspective view showing a somewhat modified process for making a tank according to this invention.

Referring to the drawings somewhat more in detail, in Figure 1 there is shown an apparatus which comprises a rotating reel generally indicated at 10 supported by bearing 12 formed on the upper end of upstanding arm 14 which is secured fixedly to the floor as by the base 16. Reel 10 is adapted for being rotated by motor 18 via chain drive 20.

2

The reel 10 consists of a central frame part that has radially projecting therefrom, at opposite ends, the hollow arms 22. As will be seen in Figure 2 the hollow arms 22 receive plungers 24 that may be spring-pressed inwardly as by springs 26. Plungers 24 may be moved outwardly in any suitable manner, as by hydraulic pressure or by a gear and rack means. There is illustrated in Figure 2, purely by way of example, a spreading screw 28 having a beveled end part 30 engaging correspondingly shaped bevels at the inner ends of plungers 24.

Plungers 24, at their outer ends, have pivotally connected therewith the transversely extending rods 32 that reach from one end of the reel to the other, as will be seen in Figure 1, and also have pivotally connected therewith the end frame members 34 and 36 which, as will best be seen in Figure 1, are also pivotally connected by links 38 to the outer end of the adjacent end of the radially extending tubular frame arms 22.

The arrangement described above provides that when the spreading screws 28, of which there is one at each end of the reel, are turned inwardly plungers 24 are moved outwardly and the reel is expanded. Thereafter, after the tank has been built up on the reel, the screws 28 are backed out, plungers 24 are moved inwardly, the reel is thereby collapsed and the tank can be removed.

Adjacent the reel referred to above, and extending parallel to the drive shaft and central arbor thereof, is a screw 40 adapted for being driven in rotation by reversible motor 42 via chain drive 44. Mounted on screw 40 is a carriage 46 which, at the opposite ends of its travel, actuates the limit switches LS1 and LS2, respectively.

Each of the limit switches provides for a direction of rotation of motor 42 which will move the carriage 46 away from the actuated limit switch, whereby the carriage reciprocates continuously between the switches so long as motor 42 is connected with an energizing source of power.

Carriage 46 carries a package 48 of material, such as cheap bulky cotton fabric or a large bobbin of very loose cotton yarn, or the like. Other inexpensive bulky materials, which can be provided in the form of bundles of fibers, either twisted or untwisted or in the form of inexpensive woven textile strips, threads or yarns, can be employed. This strip material, indicated at 50, is attached to the reel so that, as the reel rotates, this material will be wound about the wheel and, due to the reciprocation of carriage 46, will cover the reel from end to end.

Adjacent the reel, at one point about the periphery, is a sprayhead 52 and nozzles 54 through which a plastic material, such as polyester resin, is sprayed against the surface of the rotating reel.

At another point about the periphery of the reel is a station 56 which comprises infra-red radiating means or the like to supply heat to the substances on the reel in order, at least partially, to cure the same so that it becomes self-supporting and can be removed as an integral unit from the reel.

A modification of the described arrangement is illustrated in Figure 3, wherein the same reel is provided except that the textile material 70, which is supplied to the reel, is in the form of a wide ribbon. This material might, for example, be burlap or some cheap and loosely woven cotton fabric. The material is preferably the same width as the height of the tank to be manufactured. This material is led over a roll 72 to the reel and the reel rotates in the direction illustrated by the arrow past a sprayhead 74 corresponding to sprayhead 52 of the Figure 1 modification, and also past one or more heat radiating stations 76 which correspond with station 56 of the Figure 1 modification.

An additional feature of the Figure 3 modification is the supply means, as at 78, which supplies bulk material at a predetermined rate by way of the feed means 80 driven by motor 82 to the surface of the tank being constructed as it rotates. This material may be of ground corn cobs or ground corn stalks, or ground dried vegetation of any suitable sort, or other extremely inexpensive bulky material which will serve to space adjacent layers of the textile material apart, thereby to provide for a laminated light structure. Preferably, the material so supplied from hopper 78 is of a nature such that the resin supplied to the surface of the tank from sprayhead 74 will penetrate and coat the material. It is conceivable, however, that an additional sprayhead, as at 84, may be provided to impregnate or coat the textile material before it is wrapped about the tank being constructed.

Also, there may be a supply of resinous material to the tank substantially simultaneously with a supply thereto of a loose bulky material and in about the same region. This will require a sprayhead in the immediate vicinity of the feeding means 80 that would permit a somewhat greater supply of the bulk material since there would be more resin available for coating the same.

Figure 4:
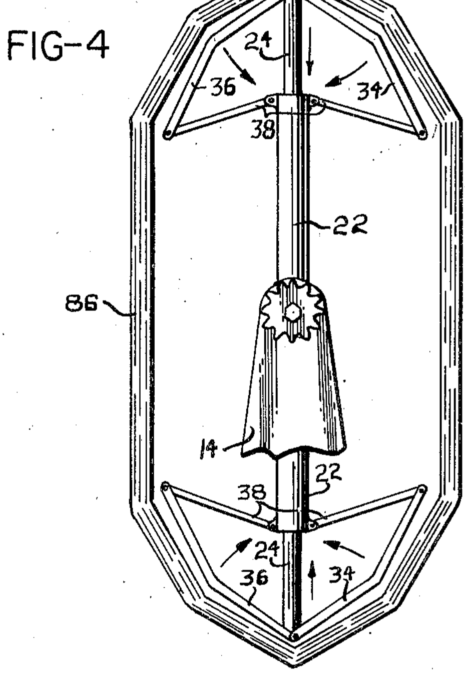
Figure 4 is an end elevational view showing a completely formed tank according to this invention, with the form collapsed therein preparatory to removing the tank from the apparatus.

In either of the tanks described above, after it has been formed on the reel and at least partially cured by the supply of heat thereto from the radiating heat stations, the said reels are collapsed as indicated in Figure 4, thereby permitting ready removal of the completed tank wall structure 86. This tank wall structure can thereafter be further cured, if necessary, and may be subsequently combined with top and bottom wall portions and with inlet and outlet means, and have baffle means provided therein, as indicated by the particular use to which the tank structure is to be put.

Figure 5:
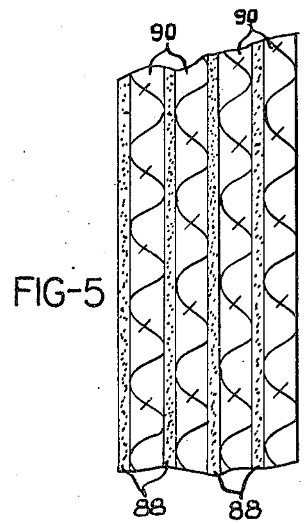
Figure 5 is a fragmentary sectional view showing diagrammatically the manner in which a laminated wall structure is built up according to this invention.

Either of the forms of the tank referred to above will appear in section somewhat as diagrammatically indicated in Figure 5, wherein there are resinous layers, as at 88, and fabric and textile layers as at 90, thus providing for a laminated type structure. The resinous material coats and, at least to a degree, penetrates the fabric, and if there is any bulky material between adjacent layers of the fabric, as provided for in the Figure 3 arrangement, the resinous material coats and seals this bulk material also.

The net result is a tank structure which is fluid tight and remains fluid tight even when subjected to considerable abuse, because in each tank wall there will be numerous substantially continuous resin layers separated by sealed filler and bulk material. Thus, if the tank is damaged so that one, or even several, of the resin layers is broken through a fluid tight tank still remains because of the other layers in the tank wall.

Due to the fact that the resin coats all of the filler and bulk material, even deterioration of the bulk material, can proceed only extremely limited distances because, in any direction through the tank wall, a plurality of resin walls will be encountered which will halt erosion, corrosion and deterioration.

A tank, according to the present invention, uses a minimum amount of the more expensive resinous material and a maximum amount of the inexpensive fiber or textile or filler material, and combines these substances in a manner to arrive at an extremely strong structure, and does it in such a manner that the manufacture of the tank is facilitated thereby providing for rapid construction with a minimum of labor costs.

It will be understood that this invention is susceptible to modification in order to adapt it to different usages and conditions, and, accordingly, it is desired to comprehend such modifications within this invention as may fall within the scope of the appended claims.

I claim:

1. A method of making the wall portion of a septic tank which comprises; rotating a collapsible form, supplying sheet material of the same width as the height of the tank wall desired to the form, winding the sheet material about the form a plurality of times to make the tank wall, continuously supplying resinous material such as polyester resin to the sheet material to coat and seal the material and form a fluid impervious tank wall, supplying bulk material between the layers of sheet material, heating the tank wall during the building up thereof on the form to set the resinous material whereby the tank wall becomes self-supporting, collapsing the form within the wall, and removing the wall from the form.

2. A method of making the wall portion of a septic tank which comprises; rotating a form for the tank wall about a longitudinal axis thereof, connecting sheet material with said form which is of about the same width as the height of the tank to be made whereby the sheet material winds about the form a plurality of times as the form rotates a plurality of times, spraying resinous material on to said sheet material as it is wound about said form, supplying a layer of bulk filler material between each pair of adjacent layers of sheet material whereby a laminated structure consisting of a plurality of layers of sheet material with bulk filler material therebetween is arrived at, and curing the resin to form a rigid fluid tight light weight tank wall.

3. A method according to claim 2 in which the tank wall being build up is continuously heated by radiant heat to such a degree during the building up of the tank wall that the resinous material is at least partly cured by the time the tank wall is completely formed whereby the tank wall is self-supporting and can be removed from the form for the complete curing of the resinous material.

4. The method of making the wall portion of a septic tank which comprises; winding relatively thin layers of textile material about a form placing lightweight bulk material between said layers to hold them in spaced relation, coating and impregnating the entire structure with a plastic material to form a fluid tight tank wall, and curing the plastic material to form a rigid light weight fluid tight tank wall.

5. An apparatus for making the wall portion of a septic tank of the nature referred to which comprises; form means adapted for rotation about a longitudinal axis thereof, means for supplying strip material to said form means so that it winds thereabout as the form means rotates, means for spraying plastic material on to the surface of the tank wall built up on the form means as it rotates, and means for supplying a lightweight bulk material between successive layers of the strip material.

6. An apparatus for making the wall portion of a septic tank of the nature referred to which comprises; form means adapted for rotation about a longitudinal axis thereof, said axis being horizontal, means for supplying sheet material to said form means so that it winds thereabout as the form means rotates, means for spraying plastic material on to the surface of the tank wall built up on the form means as it rotates, there also being means for supplying heat to the wall being built up on said form means, and means for supplying a layer of lightweight bulk material to the tank being built up from above the form means, said bulk material being supplied to the form means immediately prior to the sheet material whereby the bulk material is trapped between and held in place between successive layers of the sheet material.

7. An apparatus for making the wall portion of a septic tank which comprises; a form for the tank arranged so that the axis of the tank is horizontal, means supporting the form for rotation about the said axis, means for supplying sheet material to the said form as it rotates so that the rotation of the form will wind the strip material about the form and build up the tank wall, means for spraying plastic material on to the tank wall as it is being built up to coat and impregnate the sheet material and thus to provide for a fluid impervious tank wall, and hopper means positioned above the form operable to supply a lightweight bulk material to the tank wall as it is being built up whereby a laminated structure results, the said sheet material being supplied to the form at a point just beyond the point of application to the form of the lightweight bulk material whereby the bulk material is entrapped between successive layers, and the said means for spraying plastic material comprising means for spraying the outside of the tank wall as it approaches the point where the lightweight material is supplied thereto, and means for spraying the side of the sheet material as it approaches the tank wall that will engage the bulk material whereby both surfaces between which the bulk material is positioned are coated with the plastic material.

References Cited in the file of this patent

UNITED STATES PATENTS

| | | |
|---|---|---|
| 1,391,747 | Maltman et al. | Sept. 27, 1921 |
| 2,075,591 | Schuster | Mar. 30, 1937 |
| 2,255,887 | Katz | Sept. 16, 1941 |
| 2,352,055 | Witt | June 20, 1944 |
| 2,388,541 | Henderson | Nov. 6, 1945 |
| 2,440,762 | Sitton | May 4, 1948 |
| 2,483,564 | Sitton | Oct. 4, 1949 |
| 2,576,276 | Berglund | Nov. 27, 1951 |
| 2,614,058 | Francis | Oct. 14, 1952 |
| 2,673,587 | Cunningham | Mar. 30, 1954 |
| 2,718,583 | Noland et al. | Sept. 20, 1955 |
| 2,729,268 | Broughton et al. | Jan. 3, 1956 |

FOREIGN PATENTS

| | | |
|---|---|---|
| 128,993 | Austria | June 25, 1932 |
| 405,659 | Great Britain | Feb. 9, 1934 |